United States Patent [19]
Takahashi

[11] Patent Number: 6,147,691
[45] Date of Patent: Nov. 14, 2000

[54] APPARATUS AND METHOD FOR IMAGE PROCESSING INCLUDING COLORING PROCESS

[75] Inventor: Fumiaki Takahashi, Kawasaki, Japan

[73] Assignee: Canon Kabushiki Kaisha, Tokyo, Japan

[21] Appl. No.: 09/027,980

[22] Filed: Feb. 23, 1998

[30] Foreign Application Priority Data

Feb. 21, 1997 [JP] Japan .................................. 9-037643
Feb. 20, 1998 [JP] Japan ................................ 10-039246

[51] Int. Cl.[7] ...................................................... G06F 15/00
[52] U.S. Cl. .............................................................. 345/431
[58] Field of Search ..................................... 345/431, 429, 345/150, 433, 440, 441, 442, 118, 121

[56] References Cited

U.S. PATENT DOCUMENTS 5,801,709   5/2000   Suzuki et al. ............................ 345/424
6,057,859   5/2000   Handelman et al. ................... 345/473

*Primary Examiner*—Phu Nguyen
*Attorney, Agent, or Firm*—Robin, Blecker & Daley

[57] ABSTRACT

An image processing apparatus is arranged to set a center pixel in coloring each area within a diagram image prepared by detecting an edge in an original image, to obtain the shortest of distances from the center pixel to the edge in eight directions, and to color the inside of a coloring circle whose radius is the shortest distance. The arrangement effectively prevents a colored area form excessively bulging out beyond the edge even when the edge includes a vague part, because the area of coloring is limited to the inside of the coloring circle. Therefore, the possibility of having an image prepared in any undesirable manner can be minimized. Further, a plurality of pixels selected at uniform intervals within the diagram image are arranged to be used as the center pixel for coloring.

27 Claims, 10 Drawing Sheets

PIXEL TO BE NOTICED BEING ASSUMED TO BE "e"

● : CURRENT COLORING CENTER PIXEL ( Xp, Yp )
■ : EDGE PIXELS ( WHERE EDGE MAP DATA IS "0" )

EXAMPLE OF LOOK-UP TABLE LUT1

| Dpref | k |
|---|---|
| ~2 | 0.9 |
| 3 | 0.88 |
| 4 | 0.85 |
| 5 | 0.82 |
| 6 | 0.74 |
| 7 | 0.68 |
| 8 | 0.60 |
| 9 | 0.50 |
| 10 | 0.40 |
| 11~12 | 0.35 |
| 13~15 | 0.30 |
| 16~19 | 0.26 |
| 20~25 | 0.22 |
| 26~39 | 0.18 |
| 40~54 | 0.16 |
| 55~69 | 0.14 |
| 70~99 | 0.10 |
| 100~ | 0.05 |

FIG. 16

COLORING CIRCLE C1

Dmin = 5

APPARATUS AND METHOD FOR IMAGE PROCESSING INCLUDING COLORING PROCESS

BACKGROUND OF THE INVENTION

1. Field of the Invention

The present invention relates to an image processing apparatus or an image processing method, and more particularly, to an image processing apparatus adapted for preparing a so-called illustration image or the like including a coloring process on an original image.

2. Description of Related Art

According to one of methods heretofore adopted for preparing an illustration image, a process of area division for dividing a natural image into areas by using the technique of, for example, edge detection is performed, and, then, each of the divided areas is fully colored with an average color of that area.

Figure 1:
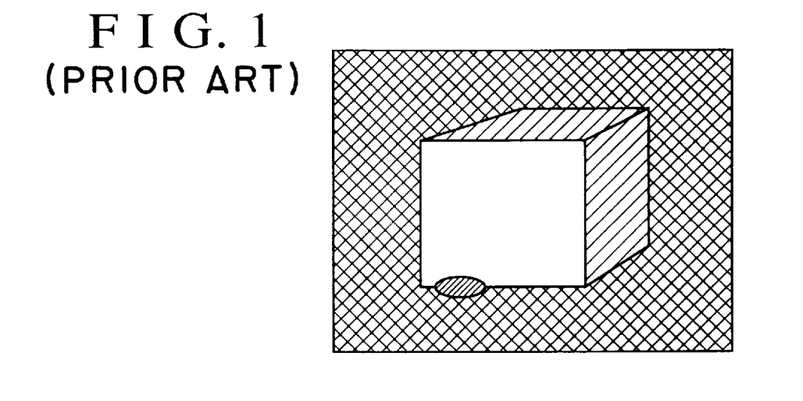
FIG. 1 shows, by way of example, an original, natural image used in preparing an illustration image.
Figure 2:
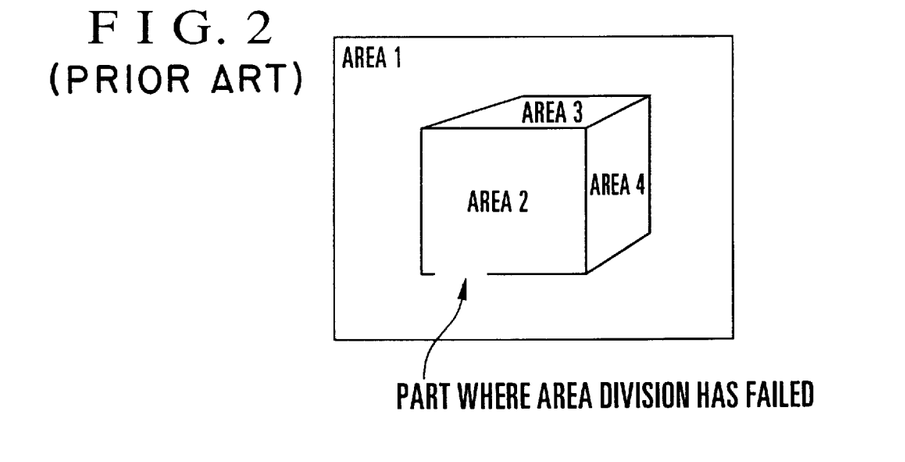
FIG. 2 shows the manner of the conventional edge detection and area division.
Figure 3:
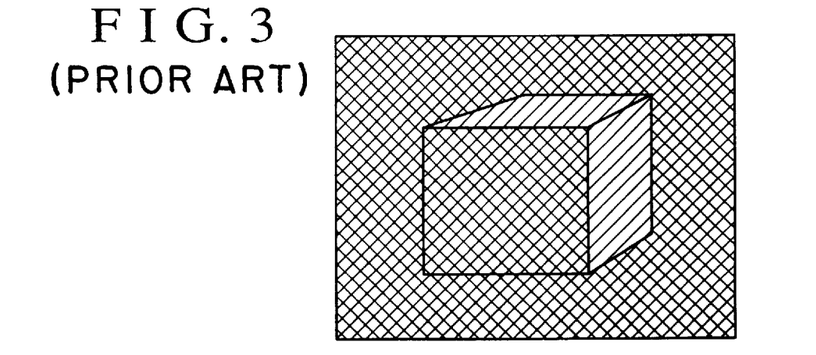
FIG. 3 shows a result of the process of preparing an illustration image carried out by the conventional method.

However, heretofore, no technique has been established for perfectly dividing a natural image into areas. In the above conventional illustration image preparing method, some image area that must be divided is sometimes left undivided. In such a case, it has been impossible to prepare an adequate illustration image. For example, in a case where the edge detecting process has been performed on a natural image sample shown in FIG. 1, if the area dividing process fails at a vague edge part, area 1 and area 2 which must be divided from each other would be processed as one and the same area as shown in FIG. 2. If the area resulting from the failure of the area division is fully colored with an average color of the area, the illustration image would become unacceptable as shown in FIG. 3. In such a case, an illustration image intended by the user is hardly obtainable.

Further, in a case where such an unacceptable part is to be repaired after completion of a coloring process on all the image areas, all the steps of the coloring process must be repeated by modifying the original image in part. The repair, however, necessitates much time and labor. Besides, the repeated coloring process might still fail to give the intended image. In such a case, the time and labor unduly impose an great burden on the user.

BRIEF SUMMARY OF THE INVENTION

The invention is directed to the solution of the above-mentioned problem. It is, therefore, an object of the invention to provide an image processing apparatus which is arranged to minimize the possibility of giving unintended images to the user.

Under the above object, in accordance with an aspect of the invention, there is provided an image processing apparatus, which comprises detecting means for detecting an edge in an original image, preparing means for preparing a diagram image on the basis of a result of detection provided by the detecting means, and coloring means for setting a center pixel within the diagram image and coloring a circular area whose center lies at the center pixel and which is set avoiding the edge.

Further, under the above object, in accordance with another aspect of the invention, there is provided an image processing method, which comprises the steps of detecting an edge in an original image, preparing a diagram image on the basis of a result of detection of the edge, setting a center pixel within the diagram image, and coloring a circular area whose center lies at the center pixel and which is set avoiding the edge.

It is another object of the invention to provide an image processing apparatus which is arranged to lessen and mitigate time and labor of the user with respect to a coloring process as a whole.

Under the above object, in accordance with a further aspect of the invention, there is provided an image processing apparatus, which comprises detecting means for detecting an edge in an original image, preparing means for preparing a diagram image on the basis of a result of detection provided by the detecting means, coloring means for sequentially setting a plurality of center pixels within the diagram image and coloring a circular area whose center lies at each of the plurality of center pixels and which is set avoiding the edge, and display means for displaying an updated, processed image every time one circular area corresponding to each of the plurality of center pixels is colored.

The above and other objects and features of the invention will become apparent from the following detailed description of an embodiment thereof taken in connection with the accompanying drawings.

DETAILED DESCRIPTION OF THE INVENTION

Hereinafter, a preferred embodiment of the invention will be described in detail with reference to the drawings.

The principle in an image processing apparatus according to the embodiment is first described as follows. An original, natural image (hereinafter referred to as the original image) which is obtained by means of a digital camera or the like is subjected to the edge detection by an edge data preparing part, so that edge data is prepared. An edge map is next prepared by binarizing the edge data with a threshold value. In preparing the edge map, "0" is substituted for each pixel detected as the edge, and "1" is substituted for each pixel not detected as the edge. Next, a diagram image corresponding to the edge map is prepared as a first illustration image. In this instance, the first illustration image is formed by indicating the pixel detected as the edge in black and indicating the pixel not detected as the edge in white. Subsequently, a coloring part performs a coloring process on the first illustration image by utilizing the edge map. For the coloring process, the coloring part first decides a coloring center point (Xp, Yp) within the image in one way or another.

Figure 4:
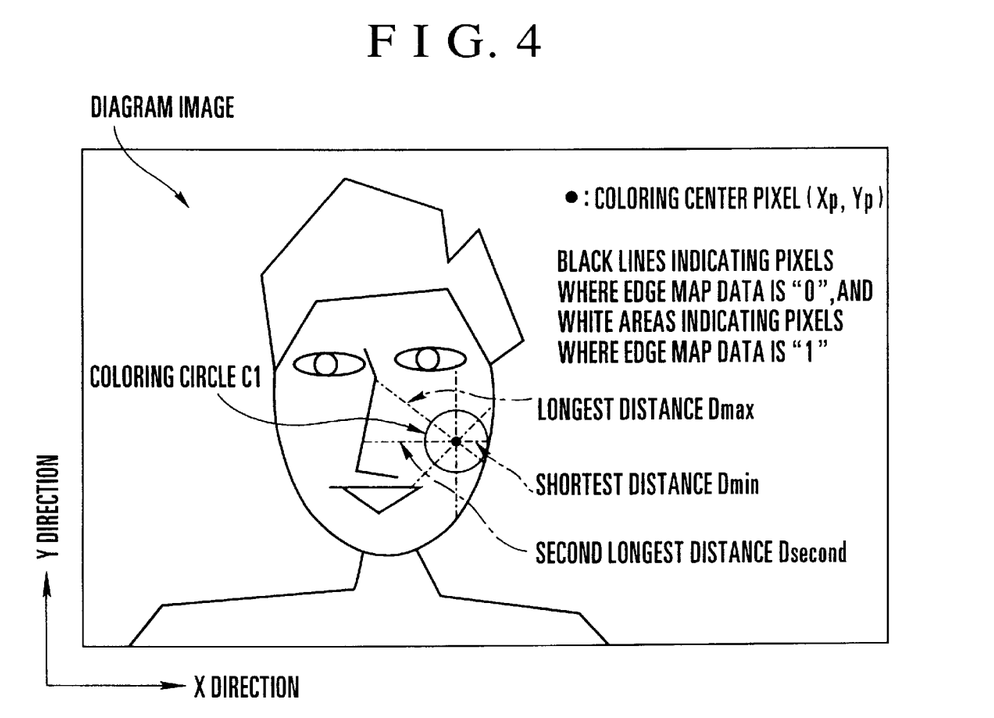
FIG. 4 schematically shows the principle of an image processing method according to the invention.

Next, a shortest distance computing part obtains distances in a plurality of directions from the coloring center pixel (Xp, Yp) to the edge of the image, as shown in FIG. 4, and, then, detects the shortest of the distances. In this instance, the shortest distance is labelled as "Dmin" as shown in FIG. 4. After the detection of the shortest distance Dmin, the inside of a circle whose center lies at the coloring center pixel and whose radius is the distance Dmin (hereinafter referred to as the coloring circle C1) is colored. In coloring the inside of the coloring circle C1, the color of each notice pixel (Xq, Yq) which is currently aimed at as a target of coloring is computed by a pixel color computing part.

The pixel color computing part is arranged to compute the color with which the notice pixel (Xq, Yq) is to be colored, on the basis of the values of the following:

(i) the color density of the coloring center pixel (Xp, Yp) in the original image;

(ii) the color density of the coloring center pixel (Xp, Yp) in the illustration image in process of coloring;

(iii) the color density of the notice pixel (Xq, Yq) in the original image;

(iv) the color density of the notice pixel (Xq, Yq) in the illustration image in process of coloring;

(v) the distance between the coloring center pixel (Xp, Yp) and the notice pixel (Xq, Yq); and (vi) the distance computed by a coloring-density-computing distance computing part (for example, the longest distance "Dmax" obtained by scanning the image from the coloring center pixel to the edge in eight directions as shown in FIG. 4 is defined as the coloring-density-computing distance).

Figure 5:
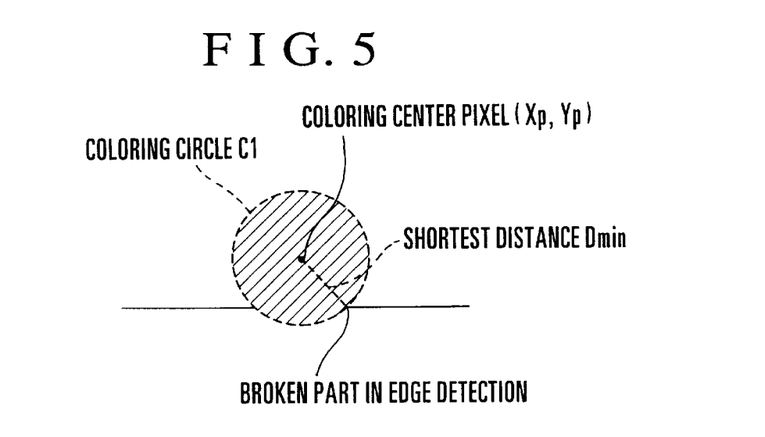
FIG. 5 shows the manner of coloring the inside of a coloring circle.

According to the coloring method which is based on the above-stated principle, even if there exists a broken part in the edge detection as in the case of FIG. 2, one of divided areas is effectively prevented from being erroneously colored in the color of another area jumping greatly beyond the broken part. Therefore, the coloring method obviates the necessity of a computing operation using a complex area dividing algorithm by spending a long period of time and prevents the user from having an unintended illustration image as a result of a failure in the area dividing process. The coloring method thus gives an adequate illustration image. FIG. 5 shows the state of coloring from the coloring center pixel located in the neighborhood of a broken part in the edge detection according to the above-stated principle. It will be understood from FIG. 5 that the coloring is performed without excessively jumping beyond the broken part in the edge detection.

Next, the image processing apparatus according to the embodiment of the invention based on the above-stated principle is described in detail as follows.

Figure 6:
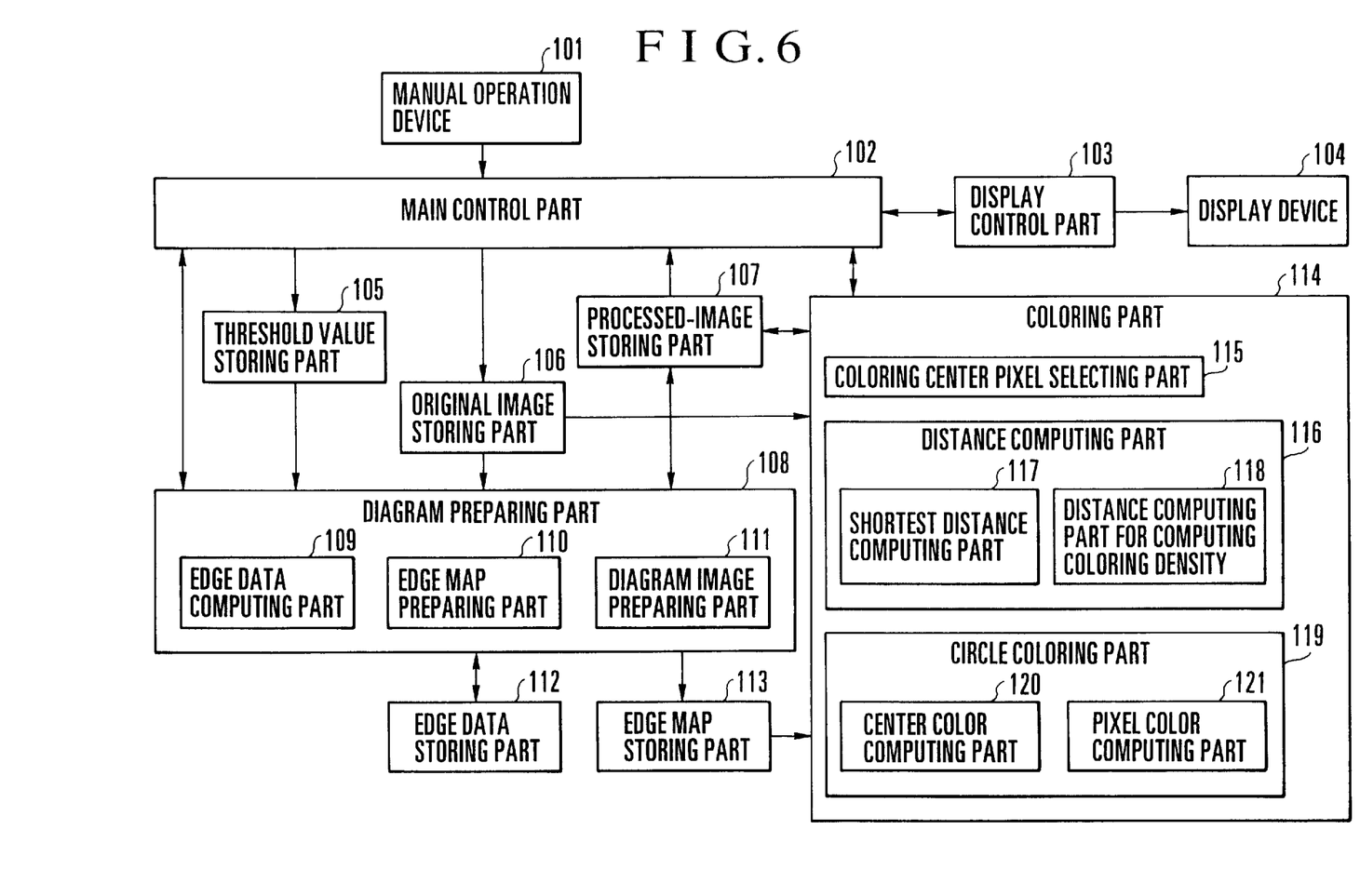
FIG. 6 is a block diagram showing the arrangement of an image processing apparatus according to an embodiment of the invention.

FIG. 6 shows the arrangement of the entirety of the image processing apparatus. Referring to FIG. 6, a manual operation device 101 includes a keyboard, a mouse, etc., to enable the user to manually input commands and data to the image processing apparatus. A main control part 102 is arranged to perform the overall control for each part of the image processing apparatus. A display control part 103 is arranged to control a display provided on a display device 104 which is composed of a CRT or the like. A threshold value storing part 105 is arranged to store therein a threshold value to be used in detecting the edge of an image. An original image storing part 106 is arranged to store therein a natural image, such as an image taken by means of a digital camera or an image taken in by means of a scanner or the like, which is to be used as an original in forming an illustration image. A processed-image storing part 107 is arranged to store an illustration image which is obtained either as a result of processing by the image processing apparatus or while the illustration image is still in process of preparation.

A diagram preparing part 108 is arranged to prepare a diagram image prior to the preparation of an illustration image. An edge data computing part 109 is arranged, within the diagram preparing part 108, to compute edge data from an original image by means of an edge detection operator and to cause the edge data to be stored in an edge data storing part 112. An edge map preparing part 110 is arranged to prepare an edge map from the edge data stored in the edge data storing part 112 and information on the threshold value stored in the threshold value storing part 105 and to cause the edge map to be stored in an edge map storing part 113. A diagram image preparing part 111 is arranged to prepare a diagram image from the edge map stored in the edge map storing part 113 and to cause the diagram image to be stored in the processed-image storing part 107.

A coloring part 114 is arranged to perform a coloring process on the diagram image which is prepared by the diagram image preparing part 111 and is stored in the processed-image storing part 107. The coloring part 114 includes a coloring center pixel selecting part 115, a distance computing part 116 and a circle coloring part 119. The coloring center pixel selecting part 115 is arranged to select a pixel to be used as a center pixel (Xp, Yp) for coloring in performing the coloring process.

The distance computing part 116 is arranged to compute a distance from the pixel selected by the coloring center pixel selecting part 115 to an edge part of the image by using data of the edge map stored in the edge map storing part 113. The distance computing part 116 includes a shortest distance computing part 117 and a coloring-density-computing distance computing part 118. The shortest distance computing part 117 is arranged to compute the shortest of distances obtained by scanning from the above-stated coloring center pixel in a plurality of predetermined directions to various edge points of the image. The coloring-density-computing distance computing part 118 is arranged to compute a distance for deciding a coloring color, by using distances obtained by scanning from the coloring center pixel in a plurality of predetermined directions to various edge points of the image.

The circle coloring part 119 is arranged to color the inside of a circle C1 whose radius is the distance computed by the shortest distance computing part 117. The circle coloring part 119 includes a center color computing part 120 and a pixel color computing part 121. The center color computing part 120 is arranged to compute the current color density of the coloring center pixel (Xp, Yp) from the values of the color density of the coloring center pixel (Xp, Yp) in the original image, the color density of the coloring center pixel in an image which is in process of coloring and is stored in the processed-image storing part 107 (hereinafter referred to as "the image in process of coloring"), the coloring-density-computing distance computed by the coloring-density-computing distance computing part 118, etc. The current color density thus computed is used as a value by which the coloring center pixel (Xp, Yp) of the image in process of coloring is updated.

The pixel color computing part 121 is arranged, within the circle coloring part 119, to compute a color density to be used in coloring each of pixels within the coloring circle C1. For example, the pixel which is currently being colored is called a notice pixel (Xq, Yq). The color density is computed from the values of the color density of the coloring center pixel (Xp, Yp) in the original image, the color density of the coloring center pixel (Xp, Yp) in the image in process of coloring stored in the processed-image storing part 107, the color density of the notice pixel (Xq, Yq) in the original image, the color density of the notice pixel (Xq, Yq) in the image in process of coloring, the distance between the coloring center pixel (Xp, Yp) and the notice pixel (Xq, Yq), the distance computed by the coloring-density-computing distance computing part 118, etc.

Figure 7:
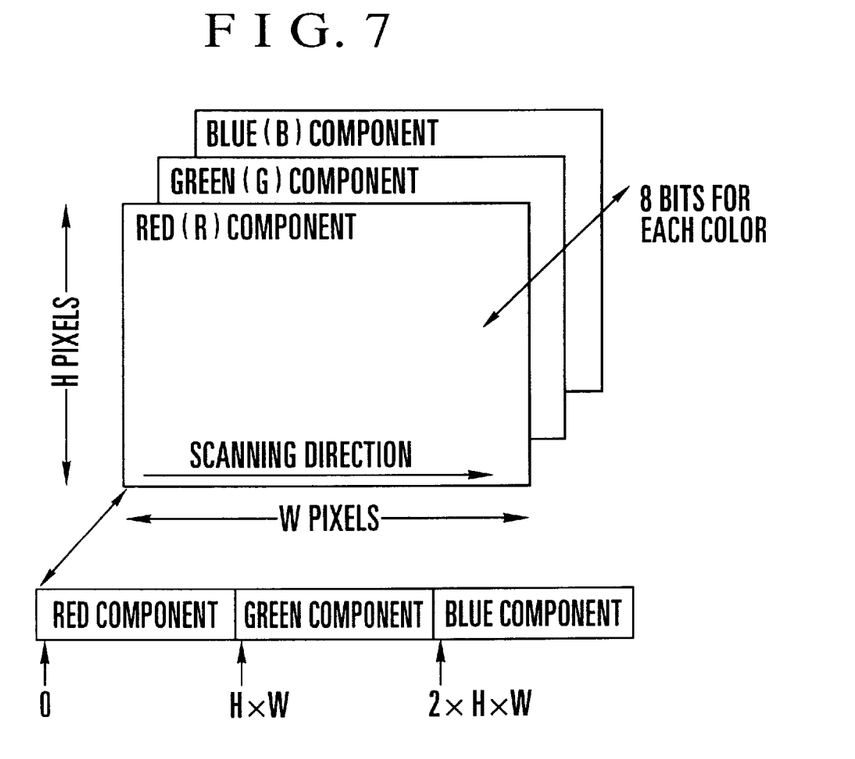
FIG. 7 shows the arrangement of image data.

FIG. 7 shows the arrangement of image data stored in the original image storing part 106 and the processed-image storing part 107. In the case of the embodiment, the image data has three color components of red, green and blue. The data of each of these colors is in 8 bits (of a dynamic range from 0 to 255). The pixels in the directions of height H and width W of each plane are scanned in an operating sequence from the lower left end to the upper right end of the plane and stored in the order of the red, green and blue components, as shown in FIG. 7. The term "color density" as used in the embodiment means a color density value obtained from a combination of the values of red, green and blue colors.

Figure 8:
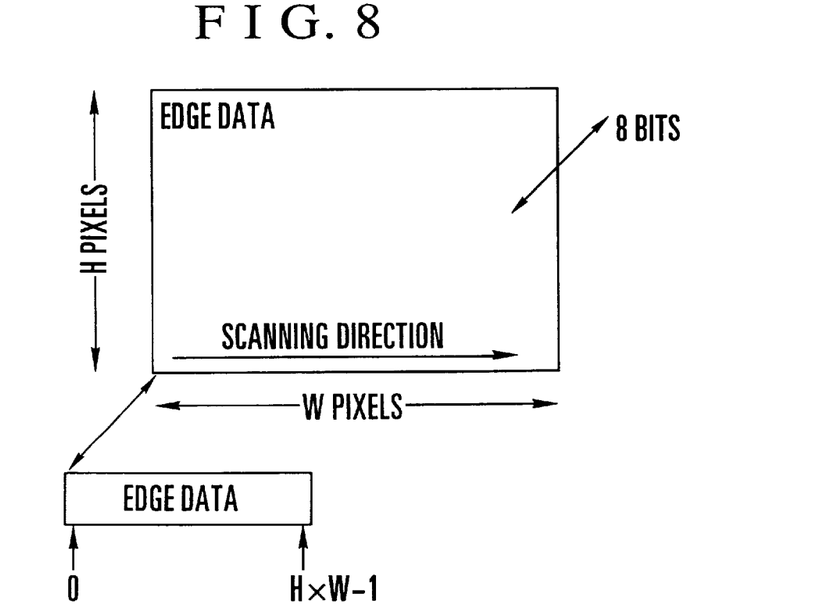
FIG. 8 shows the arrangement of edge data.

FIG. 8 shows the arrangement of edge data stored in the edge data storing part 112. In the case of the embodiment, each of these edge data represents a value (8 bits, 0 to 255) obtained by computing the intensity of the edge of the original image at each corresponding pixel by means of the edge detection operator. The edge data for pixels in the directions of height H and width W is stored in an operating sequence from the lower left end to the upper right end as shown in FIG. 8.

Figure 9:
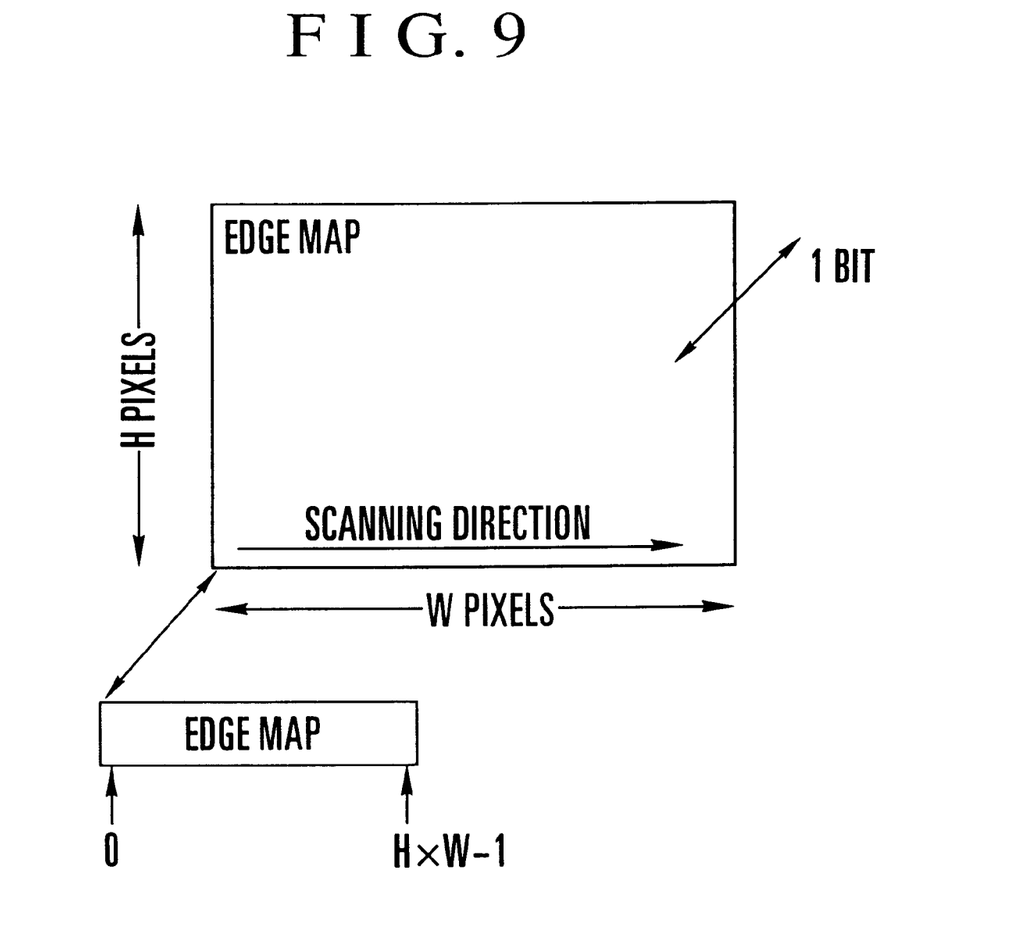
FIG. 9 shows the arrangement of edge map data.

FIG. 9 shows the arrangement of an edge map stored in the edge map storing part 113. The edge map is formed in values (0 and 1) obtained by binarizing the edge data with respect to a threshold value stored in the threshold value storing part 105. For the pixels in the directions of height H and width W, the edge map is stored in an operating sequence from the lower left end to the upper right end as shown in FIG. 9.

The operation of the image processing apparatus arranged according to the embodiment of the invention as described above is next described.

Figure 10:
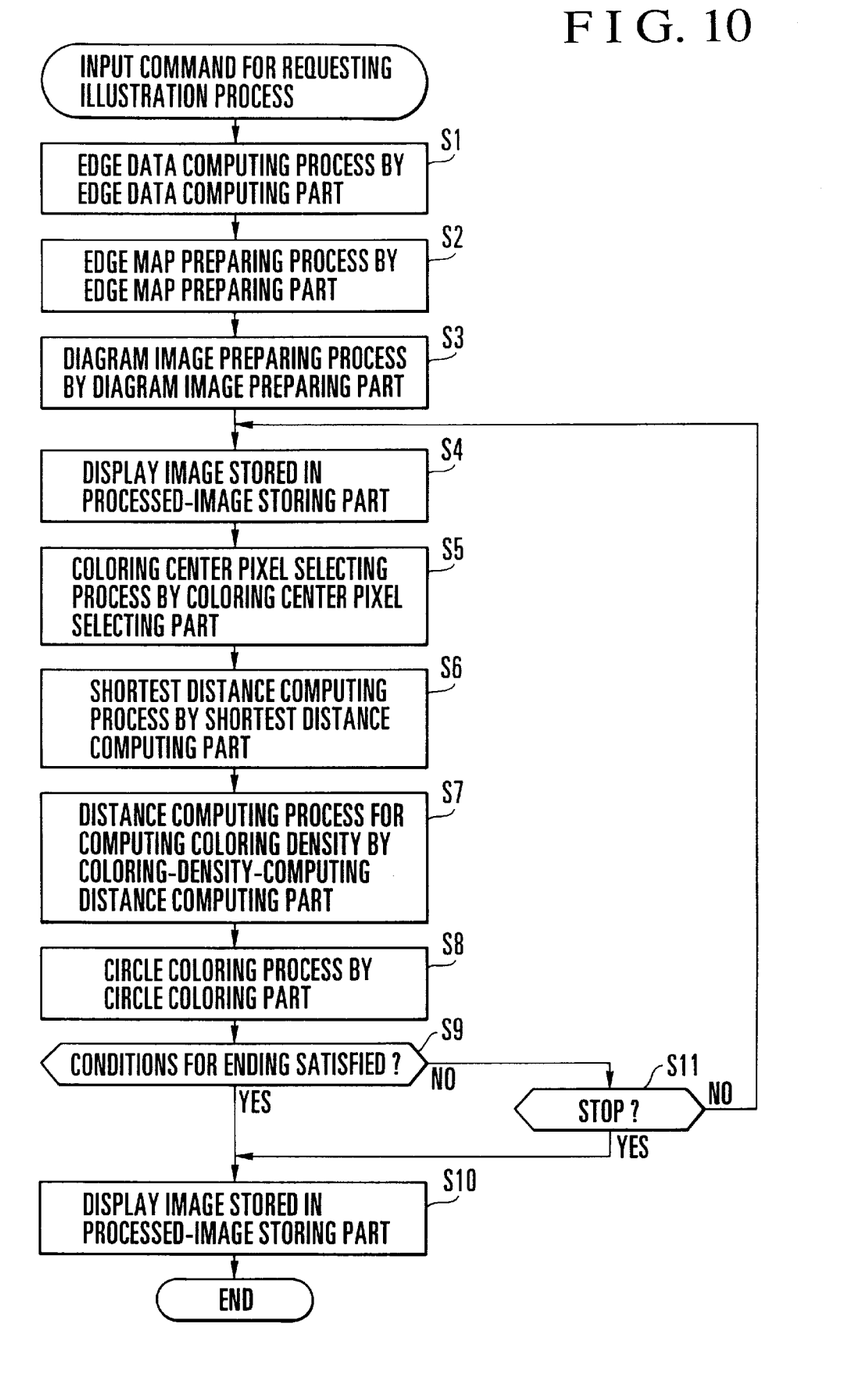
FIG. 10 is a flow chart showing procedures for processes including an edge detecting process and a coloring process.

When the user operates the operation device 101 to manually input a command requesting for an illustration process on a natural image stored in the original image storing part 106 (an illustration process requesting command), the image processing apparatus begins to prepare an illustration image according to procedures shown in FIG. 10 which is a flow chart.

Referring to FIG. 10, at a step S1, the edge data computing part 109 performs an edge data computing process. In the case of the embodiment, the edge data is computed by using the green component of the original image. The edge data computing process according to the invention is, however, not limited to this but may be carried out by using some other component for computing the edge data. The edge data may be computed, for example, from a luminance value obtained from RGB signals.

Figure 11:
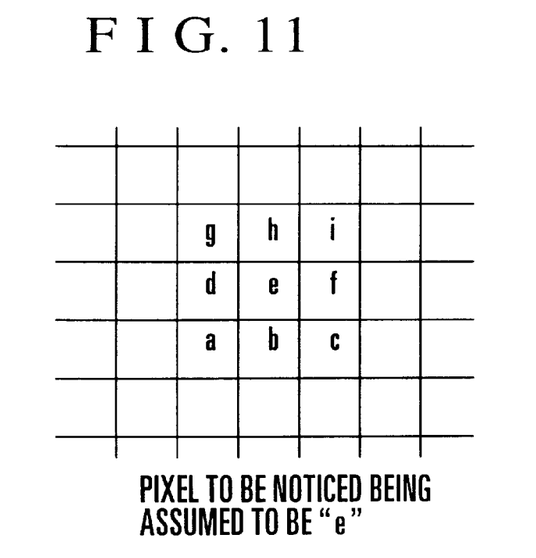
FIG. 11 shows the positional arrangement of pixels.

Referring to FIG. 11, a pixel for which edge data is to be computed (a notice pixel) is assumed to be "e", the value "Edge'" of the pixel is obtained in accordance with the following formula:

$$\text{Edge}' = a+b+c+d+f+g+h+i-8\times e \qquad (1)$$

This vale is normalized into a value "Edge" of a dynamic range from 0 to 255 by the following formula:

$$\text{Edge} = |\text{Edge}'|/8 \qquad (2)$$

The value "Edge" thus obtained is considered to be the intensity of the edge of the notice pixel.

The edge intensity is obtained by the formulas (1) and (2) by using the green component in the case of the embodiment. However, the invention is not limited to that method. The edge intensity may be obtained by using any known edge detecting operator generally in use.

At the step S1 in FIG. 10, the edge intensity obtainable by the formulas (1) and (2) is obtained for every pixel of the original image. The edge data thus obtained is stored in the edge data storing part 112.

At the next step S2, an edge map preparing process is carried out by the edge map preparing part 110. In the edge map preparing process, the value "0" is allotted to each of pixels decided to be representing the edge of the image and the value "1" is allotted to each of pixels decided to be not representing the edge of the image. According to the method conventionally used for edge detection, an edge map is prepared by binarizing the edge intensity obtained by the formula (2) on the basis of a threshold value. The conventional method is, however, not suited for the illustration process, because the conventional method causes the edge to become too thick. In the case of the embodiment, therefore, the edge map preparing part 110 performs the edge map preparing process in such a way as to make the edge thinner by not using for the edge any notice pixel that has a larger density (a luminance value, for example) than the average density value or than that of surrounding pixels in the original image, even if the edge intensity of the notice pixel exceeds the threshold value.

For example, the edge map can be prepared with a thinner line by deciding and allotting the value "0" or "1" to every one of the pixels in accordance with the following three rules:

Rule 1: Edge map data="1", if the edge data of the notice pixel "e" is equal to or less than the threshold value.

Rule 2: Edge map data="1", if the following formula (3) is established for the green component of the original image (with pixels arranged as shown in FIG. 11):

$$(a+b+c+d+f+g+h+i)/8 < e \qquad (3)$$

Rule 3: Edge map data="0", if neither the rule 1 nor the rule 2 applies.

In accordance with the above rules, the binary value of "0" or "1" is obtained for all pixels and stored in the edge map storing part 113.

At the next step S3, a diagram image preparing process is performed by the diagram image preparing part 111. In the diagram image preparing process, referring to the edge map, a pixel value of red=0, green=0 and blue=0 is assigned to a pixel whose edge map data is "0". A pixel value of red=255, green=255 and blue=255 is assigned to a pixel whose edge map data is "1". These pixel values are stored as the pixel values of corresponding pixels of the image stored in the processed-image storing part 107.

At the next step S4, the main control part 102 sends to the display control part 103 the image which is stored in the processed-image storing part 107 as a diagram image showing its edge part in black and other parts in white. The display control part 103 then causes this image to be displayed by the display device 104. When the step S4 is executed for the first time, since the diagram image formed at the step S3 is stored in the processed-image storing part 107, that diagram image is displayed by the display device 104. On the other hand, when the step S4 is executed again through a loop process, an image which is still in process of coloring is displayed by the display device 104.

Figure 12:
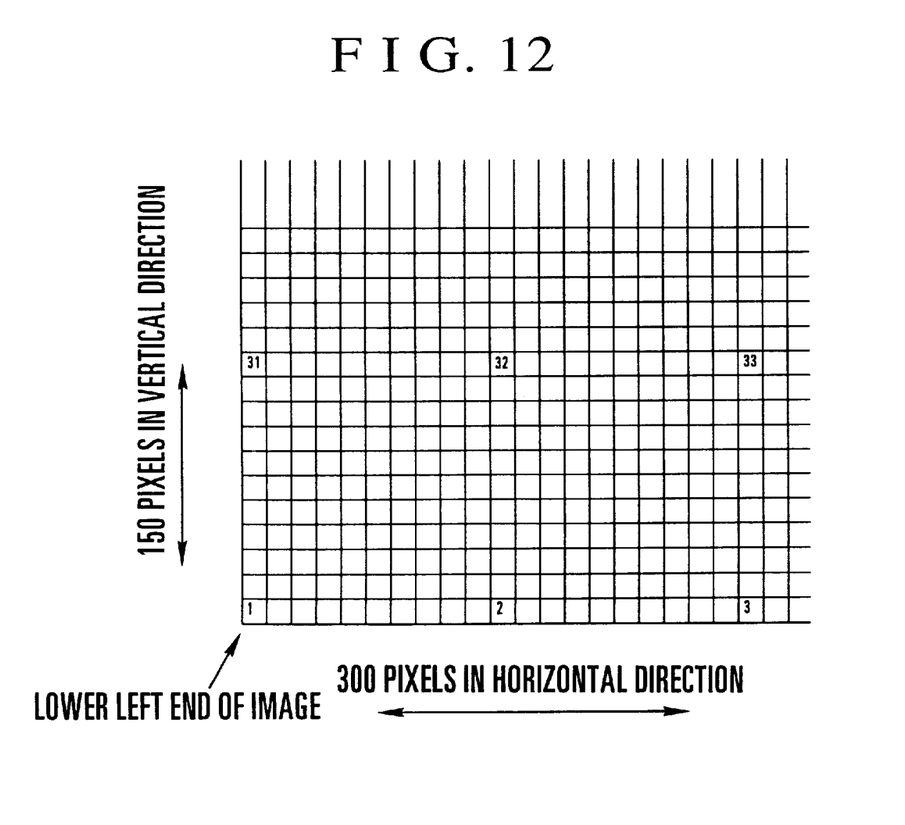
FIG. 12 shows a method of selecting a coloring center pixel.

The coloring process by the coloring part 114 begins at a step S5. At the step S5, the coloring center pixel selecting part 115 decides a coloring center pixel (Xp, Yp). Referring to FIG. 4, the coloring center pixel may be decided in any manner. However, for obtaining an adequate illustration image, it is preferable to have coloring center pixels dispersed as uniformly as possible within a two-dimensional space in the diagram image. In the case of the embodiment, the coloring center pixel (Xp, Yp) is automatically selected at every ten pixels from the lower left end of the image to the right. FIG. 12 shows the order of selecting the coloring center pixel according to such a method. As shown in FIG. 12, a pixel located at the lower left end is first selected. After that, every tenth pixel counting in the rightward direction is selected. Upon arrival at the lower right end, the selection of the coloring center pixel proceeds from another left end pixel located at the tenth position counting upward from above the first pixel toward another tenth pixel counting in the rightward direction.

Figure 13:
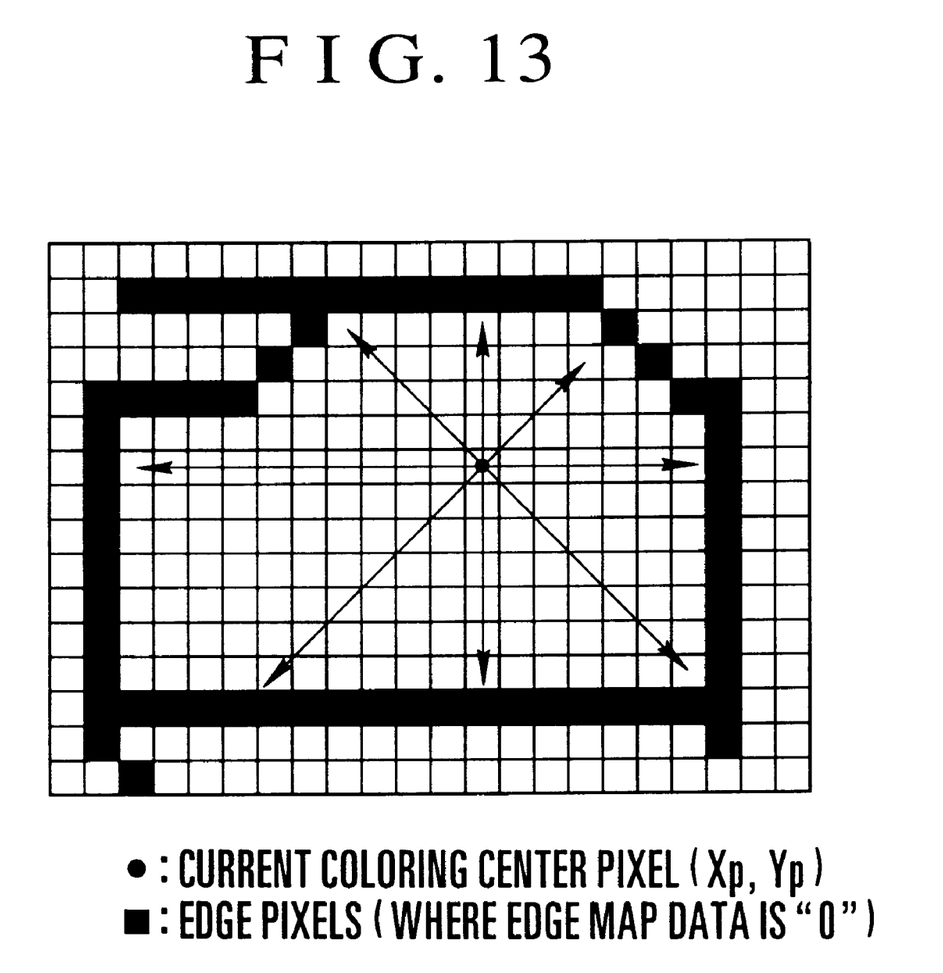
FIG. 13 shows a method of computing a distance from the coloring center pixel to the edge.

After selecting the coloring center pixel (Xp, Yp) at the step S5, the flow of operation proceeds to a step S6. At the step S6, the shortest distance computing part 117 obtains, referring to the edge map, a distance from the coloring center pixel (Xp, Yp) to the nearest point of the edge. For shortening a period of time required for processing, the shortest distance computing part 117 in the embodiment is arranged not to exactly obtain the distance to the nearest edge point but to scan pixels in eight different directions until the scanning reaches the edge point located in each of the eight directions, as shown in FIG. 13. With distances from each coloring center pixel (Xp, Yp) thus obtained by scanning pixels located in the eight directions, the shortest of the obtained distances is considered to be the shortest distance Dmin. Although the shortest distance computing part 117 is arranged, in the case of the embodiment, to obtain not exactly the shortest distance, it has been confirmed by tests that an adequate illustration image is obtainable by the above-stated method.

In the example shown in FIG. 13, the distances obtained by scanning pixels from the coloring center pixel (Xp, Yp) to the edge in the eight directions to the edge are as follows. Assuming that the upward direction as viewed in FIG. 13 is a north direction, the distance in the north direction corresponds to five pixels. The distance in the northeast direction corresponds to four pixels. The distance in the east direction corresponds to seven pixels. The distance in the southeast direction corresponds to seven pixels. The distance in the south direction corresponds to seven pixels. The distance in the southwest direction corresponds to seven pixels. The distance in the west direction corresponds to 11 pixels. The distance in the northwest direction corresponds to five pixels. With the width of one pixel assumed to be "1" as a logical unit, the distance in each of oblique directions is obtained by multiplying it by $\sqrt{2}$. As a result, the distance in the north direction is computed as 5.00, the direction in the northeast direction as 5.66, the distance in the east direction as 7.00, the distance in the southeast direction as 9.90, the distance in the south direction as 7.00, the distance in the southwest direction as 9.90, the distance in the west direction as 11.00, the distance in the northwest direction as 7.07. Therefore, in this case, the shortest distance found by the shortest distance computing process is 5.

At the next step S7, the coloring-density-computing distance computing part 118 performs a distance computing process for obtaining a distance for computing the coloring density. In the embodiment, the distance for computing the coloring density is computed in the following manner. The edge map is scanned from the coloring center pixel (Xp,Yp) in the eight directions to obtain distances from the coloring center pixel to the edge in the eight directions. After that, the longest distance Dmax of the eight distances is decided to be a coloring density computing distance Dpref. However, the invention is not limited to this. For example, the second longest distance, the third longest or an average of the first and second longest distances may be used as the coloring density computing distance Dpref. It is thus possible to use an average value of a plurality of distances as the distance Dpref. Since in the embodiment the longest of the distances in the eight directions is used as the coloring density computing distance Dpref, the distance in the west direction in the case of FIG. 13 which is computed to be "11" is used as the coloring density computing distance Dpref.

At a step S8, the circle coloring part 119 performs a circle coloring process. The circle coloring process is performed to color the inside of the coloring circle C1, the radius of which is the shortest distance Dmin obtained at the step S6 (see FIG. 4).

Figure 14:
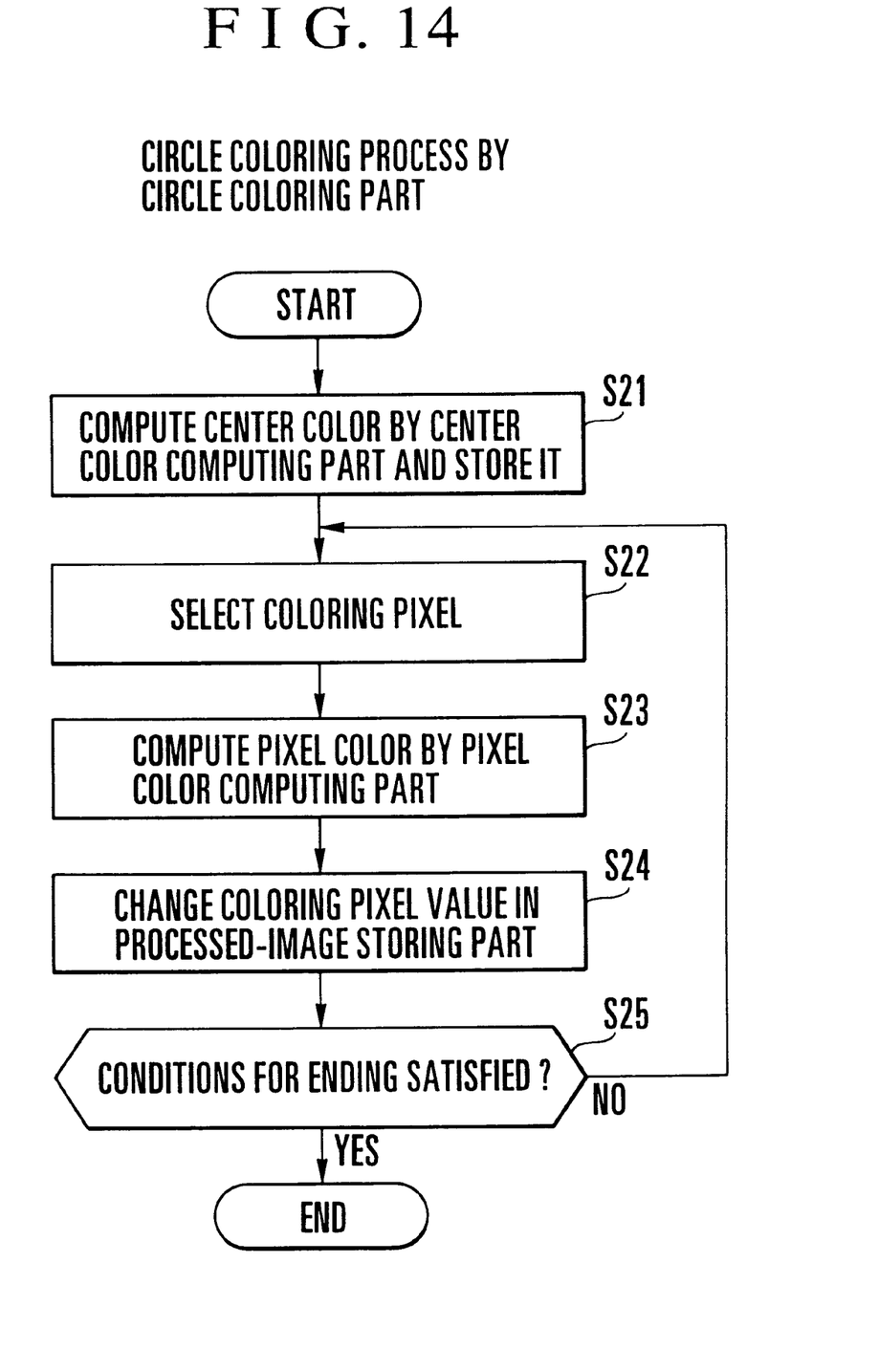
FIG. 14 is a flow chart showing procedures for a process of coloring the inside of a circle.

FIG. 14 shows in a flow chart the details of the circle coloring process to be performed by the circle coloring part 119.

At a step S21 in FIG. 14, the color of the current coloring center pixel (Xp, Yp), i.e., the coloring center color, is computed. In the embodiment, the coloring center color is computed as follows:

$$\text{CenterR} = \text{OriginR} \times k + \text{IllustR} \times (1-k)$$

$$\text{CenterG} = \text{OriginG} \times k + \text{IllustG} \times (1-k)$$

$$\text{CenterB} = \text{OriginB} \times k + \text{IllustB} \times (1-k) \qquad (4)$$

Figure 15:
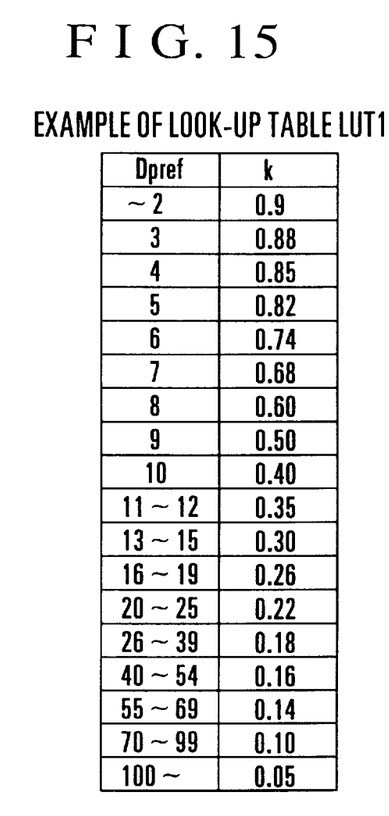
FIG. 15 shows an example of a look-up table to be used for the coloring process.

In the above formula (4), CenterR, CenterG and CenterB respectively represent the pixel values of the red, green and blue components of the coloring center color to be computed, OriginR, OriginG and OriginB respectively represent the pixel values of the red, green and blue components of the coloring center pixel (Xp, Yp) in the original image, IllustR, IllustG and IllustB respectively represent the pixel values of the red, green and blue components of the coloring center pixel (Xp, Yp) in the image which is stored in the processed-image storing part 107 and is still in process of coloring, and "k" represents a coefficient obtained from a look-up table LUT1 shown in FIG. 15. As shown in FIG. 15, in the embodiment, the coefficient "k" is obtained according to the value of the coloring density computing distance Dpref. The value of the coefficient "k" decreases accordingly as the distance Dpref increases. This is because a pixel having a large coloring density computing distance Dpref tends to be more often colored in a overlapped manner when the coloring center pixel shifts from one pixel over to another. In other words, a larger value of the coloring density computing distance Dpref means a longer distance to the edge, depending on the scanning direction. In view of this, a pixel of a larger value of the distance Dpref should be colored with a thinner color (lighter tint) at a time. The look-up table is, therefore, arranged to have such a pixel colored over and over again with a thin color by lessening the allocation of color of the original image accordingly as the value of the distance Dpref increases. While the embodiment is arranged to use a look-up table like the one shown in FIG. 15, the look-up table may be differently arranged as long as the coefficient "k" decreases accordingly as the distance Dpref increases.

After the center color (CenterR, CenterG and CenterB) is computed by the above-stated method, the center color is stored as a pixel value of the pixel (Xp, Yp) corresponding to the image which is in process and stored in the processed-image storing part 107.

Figure 16:
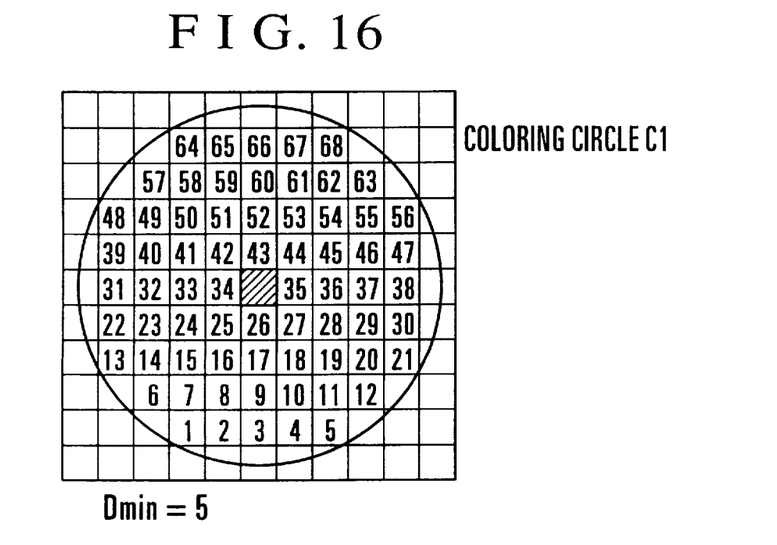
FIG. 16 shows the order of selecting pixels to be colored.

At a step S22, a coloring pixel (Xq, Yq) within the coloring circle C1 is selected. In the case of the embodiment, the coloring pixel is selected within the coloring circle C1 one after another from the lower left end of the circle in sequence, except the coloring center pixel (Xp, Yp). FIG. 16 shows the order of selection of the coloring pixels in a case where the coloring circle radius Dmin is "5".

At a step S23, the pixel color computing part 121 computes the pixel color of the current notice pixel (Xq, Yq) in the following manner:

$$fDistanceRate = \sqrt{(Xq-Xp)^2 + (Yq-Yp)^2}/Dmin^2$$

$$TargetR = CenterR \times (1 - fDistanceRate) + IllustR \times fDistanceRate$$

$$TargetG = CenterG \times (1 - fDistanceRate) + IllustG \times fDistanceRate$$

$$TargetB = CenterB \times (1 - fDistanceRate) + IllustB \times fDistanceRate \quad (5)$$

In the above formula (5), fDistanceRate represents a ratio between a distance from the coloring center pixel (Xp, Yp) to a selecting target (notice) pixel (Xq, Yq) and the radius of the coloring circle C1, TargetR, TargetG and TargetB respectively represent the values of red, green and blue components of the target pixel (Xq, Yq) to be computed, IllustR, IllustG and IllustB respectively represent the values of the red, green and blue components of the target pixel (Xq, Yq) currently stored in the processed-image storing part 107, CenterR, CenterG and CenterB respectively represent the values of the red, green and blue components of the coloring center pixel computed at the step S21.

In accordance with the above-stated pixel color computing method, the inside of the coloring circle C1 is colored with a color applied to gradually become thinner from the center toward the outside of the circle, so that an adequate illustration image can be formed.

At a step S24, the pixel values TargetR, TargetG and TargetB of the red, green and blue components which are computed at the step S23 are stored as the pixel value of the target pixel (Xq, Yq) in the processed-image storing part 107.

At a step S25, a check is made to find whether conditions for ending the process are satisfied with all pixels within the coloring circle C1 colored. In the example shown in FIG. 16, the pixels within the coloring circle C1 are colored beginning with a pixel located at the lower left end. The circle coloring process shown in FIG. 14 comes to an end, when the 68th pixel is found to have been colored. If the conditions for ending the process are not yet satisfied, the flow returns to the step S22.

Upon completion of the circle coloring process by the circle coloring part 119 as shown in FIG. 14, the flow of operation proceeds to a step S9 in FIG. 10. At the step S9, a check is made to find if conditions for ending are satisfied. In this instance, the conditions for ending mean that the circle coloring process has been carried out for all coloring center pixels up to the last coloring center pixel, following a prescribed sequence of selecting coloring center pixels. In a case where the sequence and the method of selection shown in FIG. 12 are employed, the result of the check made at the step S9 becomes "YES" upon completion of the circle coloring process for the 450th coloring center pixel located at the uppermost right end part of the image.

As apparent from FIG. 10, every time one round of the circle coloring process comes to an end, a check is made at the step S9 to find if the end of the round is the end of the last round of the circle coloring process. If not, the flow returns to the step S4 through a step S11. An image stored in the processed-image storing part 107 is displayed every time the flow thus returns to the step S4. In other words, in the case of the embodiment, a halfway-processed image which is still in an intermediate stage of process is displayed by the display device 104 every time one round of the circle coloring process comes to an end, unless a command for canceling the process is given at the manual operation device 101. Therefore, the display of the halfway-processed image enables the user to find if an illustration image is being prepared as intended by the user.

If the user finds the halfway-processed image not to be an image as intended or the user finds the halfway-processed image to have already been a desired image, he or she can stop the process to make the decision at the step S11 "YES", by manually operating the operation device 101. This operation effectively prevents a meaningless image processing action from being carried out to prepare an image not desired by the user. Further, in such a case, the embodiment enables the user to locate a cause of the inadequacy of the process.

The flow of operation proceeds to a step S10 either when the command for canceling the process is given or upon completion of the last round of the circle coloring process. At the step S10, an image stored in the processed-image storing part 107 as the final result of the illustration image preparing process is displayed by the display device 104. After the step S10, the flow of operation comes to an end.

According to the above-stated arrangement of the image processing apparatus, the coloring process can be carried out without causing the colored part to greatly spread out over and across the edge, even if the edge happens to be vague. An adequate illustration image thus can be easily prepared without resort to a complex area dividing method. The use of the shortest distance from the center pixel to the edge for coloring as described above minimizes the possibility of having the color bulge out from the edge. Further, with a plurality of coloring center pixels arranged as described, the inside of the diagram image can be colored without much spreading out the color across the edge of the image as a whole.

Further, in a case where an image has happened to be undesirably processed (colored), the arrangement of the embodiment makes the user know the undesirable state while the process is still in its intermediate stage, so that the user can cancel the process immediately. Further, the arrangement of the embodiment for displaying a halfway-processed image at an intermediate point of process enables the user to know why and where the undesired image processing operation has been performed.

What is claimed is:

1. An image processing apparatus comprising:
   (a) detecting means for detecting an edge in an original image;
   (b) preparing means for preparing a diagram image on the basis of a result of detection provided by said detecting means; and
   (c) coloring means for setting a center pixel within the diagram image and coloring a circular area whose center lies at the center pixel and which is set avoiding the edge.

2. An apparatus according to claim 1, wherein said coloring means sets a radius of the circular area according to a positional relation between the center pixel and the edge.

3. An apparatus according to claim 2, wherein said coloring means sets the radius of the circular area according to one distance of distances between the center pixel and the edge in a plurality of predetermined directions.

4. An apparatus according to claim 3, wherein said one distance is the shortest of the distances between the center pixel and the edge in the plurality of predetermined directions.

5. An apparatus according to claim 1, wherein said coloring means automatically sets a plurality of center pixels within the diagram image.

6. An apparatus according to claim 5, wherein the plurality of center pixels are set at a great number of points at uniform intervals within the diagram image.

7. An apparatus according to claim 5, wherein said coloring means sequentially colors circular areas corresponding to the plurality of center pixels.

8. An apparatus according to claim 7, further comprising display means for displaying a processed image which is updated every time one of the circular areas corresponding to the plurality of center pixels is colored.

9. An apparatus according to claim 8, further comprising manual operation means for suspending a coloring process of said coloring means, said manual operation means being manually operable when at least one of the circular areas corresponding to the plurality of center pixels has been colored.

10. An apparatus according to claim 1, wherein said coloring means decides a color for coloring the circular area according to a color in the original image.

11. An apparatus according to claim 10, wherein said coloring means decides a color for coloring the circular area according to a color of the center pixel in the original image.

12. An apparatus according to claim 10, wherein said coloring means decides a color for coloring the circular area according to a color of a pixel in the original image which corresponds to a pixel to be colored within the diagram image.

13. An apparatus according to claim 1, wherein said coloring means sequentially colors circular areas corresponding to a plurality of center pixels set within the diagram image and decides a color for coloring each of the circular areas according to a color of a halfway-colored circular area in the diagram image.

14. An apparatus according to claim 13, wherein said coloring means decides a color for coloring each of the circular areas according to a color of the center pixel of the halfway-colored circular area in the diagram image.

15. An apparatus according to claim 13, wherein said coloring means decides a color for coloring each of the circular areas according to a color of a pixel in the halfway-colored circular area which corresponds to a pixel to be colored within the diagram image.

16. An apparatus according to claim 1, wherein said coloring means sequentially colors circular areas corresponding to a plurality of center pixels set within the diagram image and decides a color for coloring each of the circular areas according to one distance of distances between the center pixel and the edge in a plurality of predetermined directions.

17. An apparatus according to claim 16, wherein said one distance is the shortest of the distances between the center pixel and the edge in the plurality of predetermined directions.

18. An image processing method comprising the steps of:
    (a) detecting an edge in an original image;
    (b) preparing a diagram image on the basis of a result of detection of the edge;
    (c) setting a center pixel within the diagram image; and
    (d) coloring a circular area whose center lies at the center pixel and which is set avoiding the edge.

19. A method according to claim 18, wherein, in said coloring step, a radius of the circular area is set according to the shortest of distances between the center pixel and the edge in a plurality of predetermined directions.

20. A method according to claim 18, wherein, in said coloring step, a great number of pixels selected at uniform intervals within the diagram image are automatically set as the center pixel, and a plurality of circular areas corresponding to the great number of center pixels are sequentially colored.

21. A method according to claim 20, further comprising a step of displaying a processed image which is updated every time one of the circular areas corresponding to the plurality of center pixels is colored.

22. A method according to claim 21, further comprising a step of allowing a manual operation to be performed to suspend a coloring process on the plurality of circular areas when at least one of the circular areas corresponding to the plurality of center pixels has been colored.

23. A method according to claim 18, wherein, in said coloring step, circular areas corresponding to a plurality of center pixels set within the diagram image are sequentially colored, and a color for coloring each of the circular areas is decided according to one distance of distances between the center pixel and the edge in a plurality of predetermined directions.

24. An image processing apparatus comprising:
    (a) detecting means for detecting an edge in an original image;
    (b) preparing means for preparing a diagram image on the basis of a result of detection provided by said detecting means;
    (c) coloring means for setting a plurality of center pixels within the diagram image and coloring areas each whose center lies at each of the plurality of center pixels; and
    (d) display means for displaying a processed image which is updated every time one of the areas corresponding to the plurality of center pixels is colored.

25. An apparatus according to claim 24, further comprising manual operation means for stopping a coloring process of said coloring means, said manual operation means being manually operable when at least one of the areas corresponding to the plurality of center pixels has been colored.

26. A storage medium which stores a program for executing processing for an image processing apparatus, said storage medium allowing the image processing apparatus to execute the following processing:

(a) detecting an edge in an original image;

(b) preparing a diagram image on the basis of a result of detection of the edge;

(c) setting a center pixel within the diagram image; and (d) coloring a circular area whose center lies at the center pixel and which is set avoiding the edge.

27. A storage medium which stores a program for executing processing for an image processing apparatus, said storage medium allowing the image processing apparatus to execute the following processing:

(a) detecting an edge in an original image;

(b) preparing a diagram image on the basis of a result of detection of the edge;

(c) setting a plurality of center pixels within the diagram edge;

(d) coloring areas each whose center lies at each of the plurality of center pixels; and (e) displaying a processed image which is updated every time one of the areas corresponding to the plurality of center pixels is colored.

* * * * *

UNITED STATES PATENT AND TRADEMARK OFFICE
CERTIFICATE OF CORRECTION

PATENT NO.     : 6,147,691
DATED          : November 14, 2000
INVENTOR(S)    : Fumiaki Takahashi It is certified that error appears in the above-identified patent and that said Letters Patent is hereby corrected as shown below:

Column 6,
Line 10, delete "vale" and insert -- valve --.

Signed and Sealed this

First Day of January, 2002

Attest:

Attesting Officer

JAMES E. ROGAN
Director of the United States Patent and Trademark Office